United States Patent
Wang

(10) Patent No.: US 9,513,129 B2
(45) Date of Patent: Dec. 6, 2016

(54) LOW AUTHORITY GPS AIDING OF NAVIGATION SYSTEM FOR ANTI-SPOOFING

(71) Applicant: The Boeing Company, Chicago, IL (US)

(72) Inventor: Hanching Grant Wang, Madison City, AL (US)

(73) Assignee: THE BOEING COMPANY, Chicago, IL (US)

(*) Notice: Subject to any disclaimer, the term of this patent is extended or adjusted under 35 U.S.C. 154(b) by 548 days.

(21) Appl. No.: 14/019,004

(22) Filed: Sep. 5, 2013

(65) Prior Publication Data

US 2014/0005938 A1   Jan. 2, 2014

Related U.S. Application Data

(62) Division of application No. 12/098,014, filed on Apr. 4, 2008, now Pat. No. 8,600,671.

(51) Int. Cl.

| | |
|---|---|
| *G01C 21/26* | (2006.01) |
| *G01C 21/20* | (2006.01) |
| *G01S 19/07* | (2010.01) |
| *G01S 19/41* | (2010.01) |
| *G01C 21/16* | (2006.01) |
| *G01S 19/21* | (2010.01) |
| *G01S 19/47* | (2010.01) |

(52) U.S. Cl.
CPC ........... *G01C 21/165* (2013.01); *G01S 19/215* (2013.01); *G01S 19/47* (2013.01)

(58) Field of Classification Search
None
See application file for complete search history.

(56) References Cited

U.S. PATENT DOCUMENTS

| | | | |
|---|---|---|---|
| 3,310,876 A * | 3/1967 | Yamron | G01C 21/165 244/3.2 |
| 5,512,903 A | 4/1996 | Schmidtke | |
| 5,619,211 A | 4/1997 | Horkin et al. | |
| 5,995,556 A | 11/1999 | Thomas, Jr. | |
| 6,037,893 A | 3/2000 | Lipman | |
| 6,408,245 B1 | 6/2002 | An et al. | |

(Continued)

OTHER PUBLICATIONS

Wang et al., "Ultra-Tightly-Coupled GPS-Inertial Navigation Systems," Nov. 2006, AIAA Missile Conference, pp. 1-17.

(Continued)

*Primary Examiner* — Ariel Yu
(74) *Attorney, Agent, or Firm* — Yee & Associates, P.C.

(57) ABSTRACT

A method and apparatus for generating navigation solutions. A global positioning system based navigation solution unit; an inertial navigation solution unit; a correction unit, a limiter, and an adding unit. The global positioning system based navigation solution unit is capable of generating a first navigation solution. The inertial navigation solution unit is capable of generating a second navigation solution. The correction unit is capable of generating a raw correction. The limiter is capable of selectively modifying the raw correction to fall within a selected range of corrections to form a correction. The adding unit is capable of adding the correction to the second navigation solution to form a navigation solution.

10 Claims, 9 Drawing Sheets

(56) References Cited

U.S. PATENT DOCUMENTS

| | | | |
|---|---|---|---|
| 6,411,254 B1 * | 6/2002 | Moeglein | H03J 7/047 |
| | | | 342/357.42 |
| 6,429,808 B1 * | 8/2002 | King | G01S 19/05 |
| | | | 342/357.44 |
| 6,442,481 B2 | 8/2002 | Miller | |
| 6,760,663 B2 | 7/2004 | Brenner | |
| 7,089,452 B2 | 8/2006 | Rubin et al. | |
| 7,149,610 B2 | 12/2006 | Wang et al. | |
| 7,409,290 B2 | 8/2008 | Lin | |
| 7,669,513 B2 | 3/2010 | Niv et al. | |
| 8,065,074 B1 | 11/2011 | Liccardo | |
| 2005/0049764 A1 | 3/2005 | Wang et al. | |
| 2005/0234644 A1 | 10/2005 | Lin | |
| 2007/0119296 A1 | 5/2007 | Niv et al. | |
| 2009/0254278 A1 | 10/2009 | Wang | |
| 2010/0007554 A1 | 1/2010 | Wang et al. | |

OTHER PUBLICATIONS

Office Action, dated Oct. 26, 2011, regarding U.S. Appl. No. 12/098,014, 13 pages.
Final Office Action, dated Mar. 27, 2012, regarding U.S. Appl. No. 12/098,014, 20 pages.
Office Action, dated Dec. 20, 2012, regarding U.S. Appl. No. 12/098,014, 20 pages.
Notice of Allowance, dated May 28, 2013, regarding U.S. Appl. No. 12/098,014, 15 pages.

* cited by examiner

LOW AUTHORITY GPS AIDING OF NAVIGATION SYSTEM FOR ANTI-SPOOFING

This application is a divisional of application Ser. No. 12/098,014, filed Apr. 4, 2008.

GOVERNMENT LICENSE RIGHTS

This invention was made with Government support under F42610-98-C-0001 awarded by the United States Air Force. The Government has certain rights in this invention.

BACKGROUND INFORMATION

1. Field

The present disclosure relates generally to navigation systems and in particular to navigation systems that use global positioning systems and inertial measurement units. Still more particularly, the present disclosure relates to a low authority global positioning system aided inertial navigation system with anti-GPS-spoofing for use on moving vehicles.

2. Background

A global positioning system (GPS) is a space based radio navigation system that provides reliable positioning, navigation, and timing services on a continuous world-wide basis. A global positioning system includes satellites orbiting the earth, control monitoring stations on the earth, and global positioning system receivers. The global positioning satellites broadcast signals from space that are received and tracked by global positioning receivers. Each global positioning receiver may then estimate and provide a three dimensional location. This three dimensional location may include, for example, latitude, longitude, and altitude. Additionally, time may be obtained from these signals that are broadcast by the satellites.

Global positioning systems have been employed in many navigation applications. Some concerns exist in using global positioning system information in some types of navigation systems. These concerns are present when certain levels of accuracy of the location of the vehicle are absolutely needed. In some cases, global positioning system performance may degrade in environments in which jamming, interference, or radiation is present. These types of situations are of concern for both military and commercial aviation applications. However, when global positioning system accuracy degrades, this degradation is usually detected by the integrity-monitoring flight software. Further, various measures are available to counter these types of problems.

In some cases, spoofing of global positioning signals also may occur. In other cases, meaconing of the signals also may occur. Meaconing involves the interception and rebroadcast of navigation signals. These signals may be rebroadcast on a received frequency to confuse adversarial global positioning system navigation systems. As a result, an aircraft may compute an inaccurate location.

With respect to spoofing and meaconing of global positioning signals, the accuracy may be severely degraded beyond a desired range. These types of global positioning system threats and anomalies are more difficult to detect.

Therefore, it would be advantageous to have a method and apparatus for a navigation system that overcomes these problems.

SUMMARY

The advantageous embodiments provide a method and apparatus for generating navigation solutions. In one advantageous embodiment a method is provided for generating a navigation solution. An inertial navigation solution is generated using a set of inertial sensor measurements. A blended global positioning system and inertial navigation system navigation solution is generated using a set of global positioning system receiver measurements and a set of inertial sensor measurements. A raw global positioning system navigation correction is computed as the difference between the inertial navigation solution and blended global positioning system and the inertial navigation system navigation solution. A global positioning system correction is computed by applying a limit on the raw global positioning system navigation correction. The inertial navigation solution and the global positioning system correction are added to form a global positioning system-aided navigation solution.

In another advantageous embodiment, a method is provided for generating a navigation solution. A set of inertial navigation solutions is generated using inertial sensor measurements. A blended global positioning system and inertial navigation system navigation solution is generated using a set of global positioning system receiver measurements and a set of inertial sensor measurements. A raw global positioning system navigation correction is computed as the difference between the inertial navigation solution and blended global positioning system and the inertial navigation system navigation solution. The raw global positioning system navigation correction is stored with a time stamp. The raw global positioning system navigation correction at a specified past time stamp is retrieved. A low authority global positioning system correction is computed by applying a limit upon the retrieved raw global positioning system navigation correction. The inertial navigation solution and the low authority global positioning system correction are added to form the navigation solution.

In still another advantageous embodiment, a method is provided for generating a navigation solution. An inertial navigation solution is generated using a set of inertial sensor measurements. A blended global positioning system and inertial navigation system navigation solution is generated using a set of global positioning system receiver measurements and the set of inertial sensor measurements. A raw global positioning system navigation correction is computed as the difference between the inertial navigation solution and blended global positioning system and the inertial navigation system navigation solution. The raw global positioning system navigation correction is stored with a time stamp. A global positioning system-only navigation solution is generated. Monitoring is performed for global positioning system spoofing. Responsive to detecting the global positioning system spoofing, a selected raw global positioning system navigation correction at a past time before the global positioning system spoofing was detected is retrieved. A low authority global positioning system correction is computed by applying a limit upon the retrieved raw global positioning system navigation correction. The inertial navigation solution and the low authority global positioning system correction are added to form the navigation solution.

In yet another advantageous embodiment, an apparatus comprises a global positioning system based navigation solution unit; an inertial navigation solution unit; a correction unit, a limiter, and an adding unit. The global positioning system based navigation solution unit is capable of generating a first navigation solution. The inertial navigation solution unit is capable of generating a second navigation solution. The correction unit is capable of generating a raw correction. The limiter is capable of selectively modifying the raw correction to fall within a selected range of corrections to form a correction. The adding unit is capable of adding the correction to the second navigation solution to form a navigation solution.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
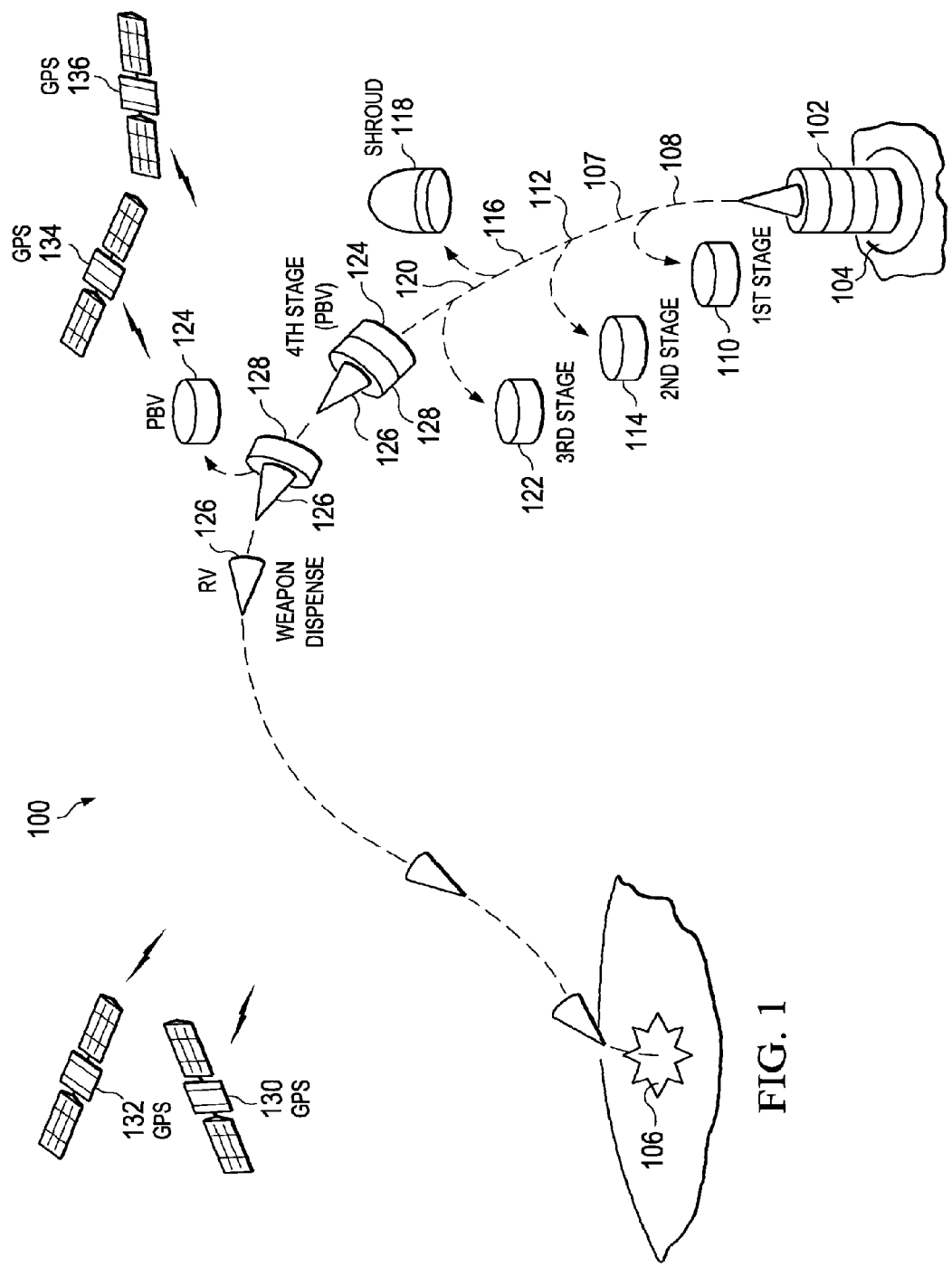
FIG. 1 is a diagram illustrating a mission in which a vehicle may use a low authority global positioning system aiding for range safety in accordance with an advantageous embodiment.

With reference now to the figures and in particular with reference to FIG. 1, a diagram illustrating a mission in which a vehicle may use a low authority global positioning system aiding is depicted in accordance with an advantageous embodiment. In this example, mission 100 illustrates a missile operation in which missile 102 may launch from origin 104 and reach target 106.

Missile 102 requires guidance, navigation, and control to reach target 106 in these examples. The guidance is a function in missile 102 that determines where missile 102 is going, such as towards target 106. The navigation determines where missile 102 is located. For example, the guidance function in missile 102 may provide information, such as target trajectory in terms of desired position, velocity, and altitude. The function generating this target trajectory is also known as a guidance law function. The navigation determines where missile 102 is located at a particular time.

For example, the navigation for missile 102 may provide the current position, velocity, and altitude. This information is also referred to as a navigation solution. The control in missile 102 determines how to control flight of the missile 102 to target 106 based on the target trajectory and the navigation solution. These commands may be sent to various actuators for control surfaces. The functions generating these commands are also referred to as control law function.

As missile 102 travels along trajectory 107 from origin 104 to target 106, different parts of missile 102 are discarded or dropped off. At point 108, first stage 110 is a solid booster that drops from missile 102. At point 112, second stage 114, which also is a solid booster, drops from missile 102. At point 116, shroud 118 falls away from missile 102. At point 120, third stage 122, a solid booster, falls away from missile 102. At this point, missile 102 comprises post boost vehicle 124 and reentry vehicle 126. Next, at point 128 post boost vehicle 124 dispenses reentry vehicle 126.

Missile 102 may be guided along trajectory 107 using different types of guidance. For example, from origin 104 until point 128, missile 102 may use all inertial navigation. From point 128 until reaching target 106, missile 102 uses low authority global positioning system aiding to guide missile 102 to target 106.

During these different stages, all inertial navigation is used to ensure that no safety concerns occur due to global positioning system anomalies. A course correction through these stages may correct propulsion variations in prior stages due to manufacturing tolerance and temperature. Further, the course velocity correction also may extend the range of missile 102.

In these examples, a course velocity correction may occur following each of the burn states to reduce required fuel. During the different stages, the different advantageous embodiments continuously compute a number of different navigation solutions in which raw global positioning system navigation corrections are computed and stored, but not applied during this portion of trajectory 107.

Spoofing and meaconing may occur anytime during trajectory 107. As a result, global positioning system base navigation corrections computed in these earlier stages may be applied later in flight such as at point 128 to allow time for spoofing detection. In these examples, the application of global positioning system based navigation corrections are used in a delayed sense towards the later portions of trajectory 107. These corrections occur as long as the required fuel consumption is acceptable. As a result, more time is present to detect global positioning system threats and anomalies using longer durations of data.

At this point, missile 102 employs low authority global positioning system aiding to navigate to target 106. This type of navigation uses global positioning signals that may be received from global positioning system satellites 130, 132, 134, and 136. The final velocity corrections in these examples correct for any inaccuracies in velocity from the course corrections and also may take into account global positioning system based navigation corrections previously computed. During the final velocity correction in this example, limits to global positioning system base navigation correction may be applied to improve accuracy while ensuring safety.

Further, total burn time also may be set to provide extra fault protection. If any global positioning system threats and anomalies are detected towards the end of the mission, the navigation system may go back in time to undo unwanted velocity corrections. After the completion of the fire and velocity correction, reentry vehicle 126 may be dispensed with high navigational accuracy.

Although mission 100 is described as a mission for a missile operation, the different advantageous embodiments may be applied to other types of missions or uses. For example, the different advantageous embodiments may be employed in missions involving spacecraft, fighter aircraft, and other suitable vehicles.

Figure 2:
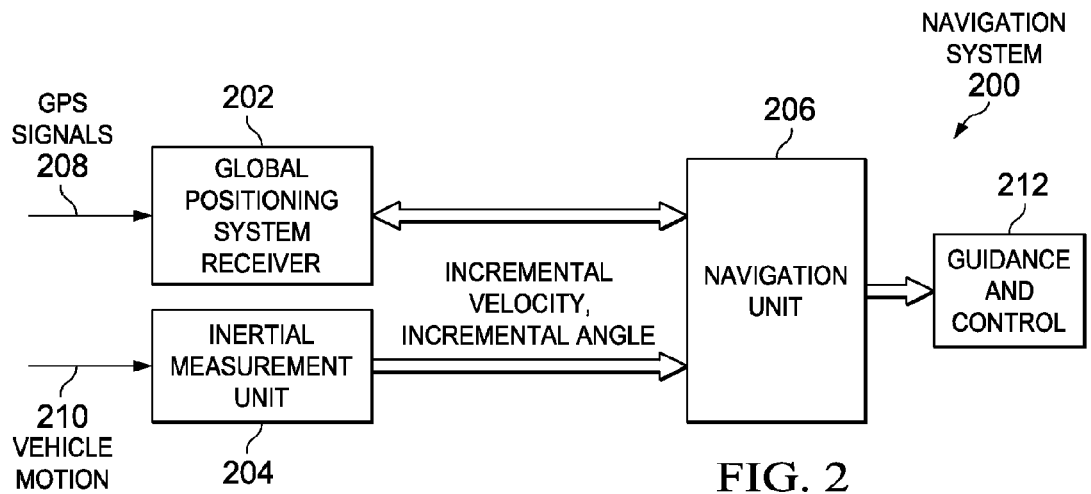
FIG. 2 is a diagram of a global positioning system and inertial navigation system navigation system in accordance with an advantageous embodiment.

Turning now to FIG. 2, a diagram of a global positioning system and inertial navigation system is depicted in accordance with an advantageous embodiment. In this example, navigation system 200 includes global positioning system receiver 202, inertial measurement unit 204, and navigation unit 206. Navigation system 200 is an example of a navigation system that may be used in a vehicle, such as missile 102 in FIG. 1. Of course, this type of navigation system may be used in other vehicles, such as, for example, a fighter aircraft, a spacecraft, or some other suitable vehicle.

Navigation system 200 may take various forms. For example, navigation system 200 may be a loosely coupled global positioning system and inertial navigation system, a tightly coupled global positioning system and inertial navigation system, or an ultra-tightly-coupled global positioning system and inertial navigation system. In the form of a loosely coupled navigation system, global positioning system receiver 202 acts as a self contained navigation system and actually computes a navigation solution.

In an ultra tightly coupled navigation system, global positioning system receiver 202 functions as a range residual sensor in which the information in the form of I and Q measurements are output to navigation unit 206. These I and Q measurements are in-phase and quadrature measurements. As a tightly coupled navigation system, global positioning system receiver 202 is treated as a range sensor outputting pseudo ranges and delta pseudo range information to navigation unit 206.

Global positioning system receiver 202 receives global positioning system signals 208 from sources, such as satellites. Global positioning system receiver 202 generates in phase and quadrature measurements that are sent to navigation unit 206 for use in estimating the location of global positioning system receiver 202.

Inertial measurement unit 204 also provides position information to navigation unit 206. Inertial measurement unit 204 provides inertial measurements by measuring or detecting the vehicle motion 210 of the vehicle in which navigation system 200 resides. Inertial measurement unit 204 may provide information in the form of incremental velocity and increment angle as the vehicle moves. Inertial measurement unit 204 may provide information to track the position, orientation, and velocity of the vehicle without any external references.

Inertial measurement unit 204 may take various forms. For example, inertial measurement unit 204 may include a computer and motion sensors to generate this information. These motion sensing devices may include, for example, accelerometers, gyroscopes, and/or other motion sensing devices.

In other words, global positioning system receiver 202 and inertial measurement unit 204 provide raw measurement data used by navigation unit 206 to compute or generate navigation solutions. Navigation unit 206 receives the positioning information from global positioning system receiver 202 and inertial measurement unit 204 to generate navigation solutions. These navigation solutions are used by other components in the vehicle to guide the vehicle. For example, the navigation solutions may be used by guidance and control 212. Guidance and control 212 use this information to control movement of the vehicle.

Figure 3A:
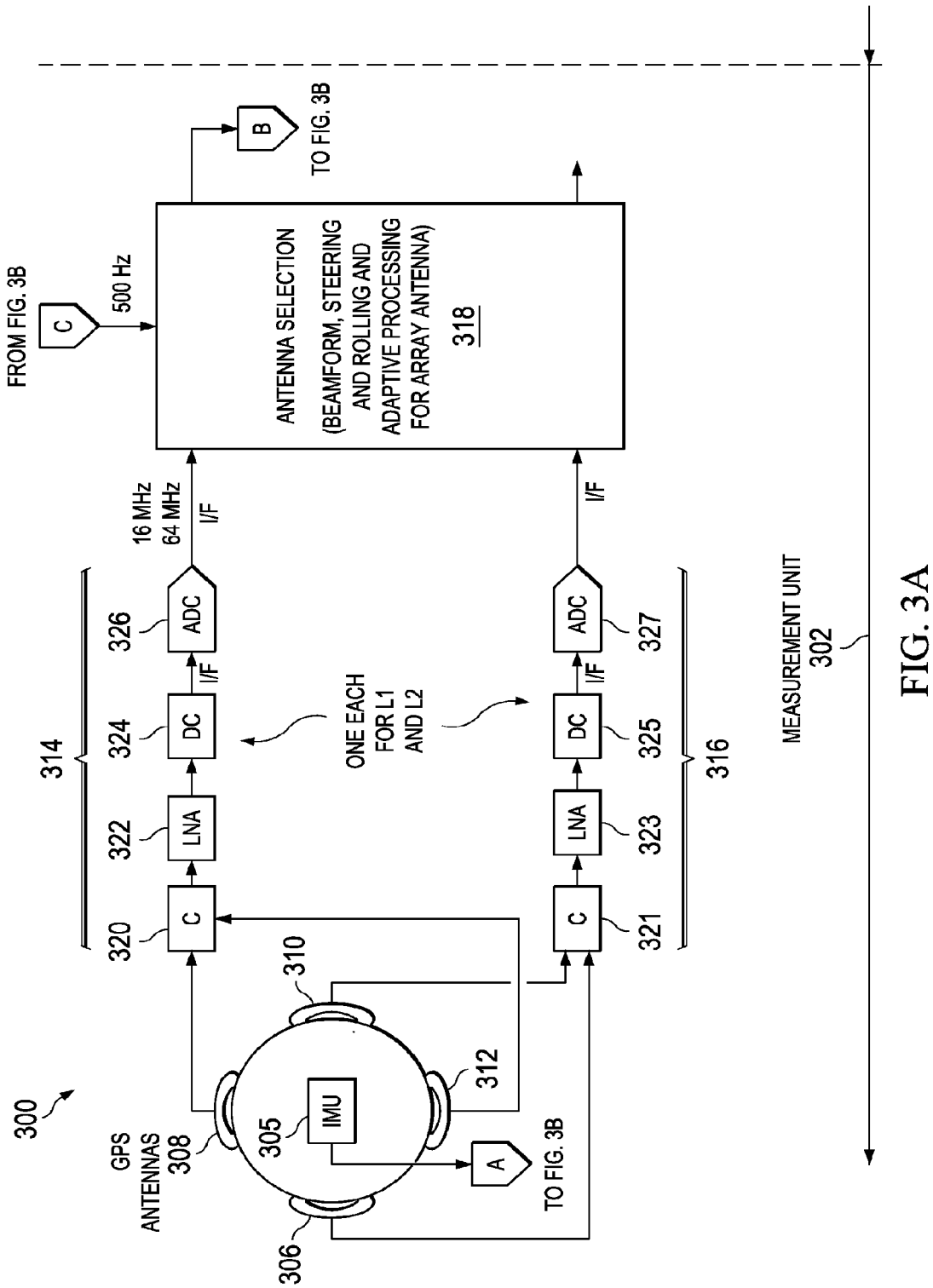
FIGS. 3A and 3B are a schematic diagram of an ultra-tightly-coupled global positioning system and inertial navigation system navigation system in accordance with an advantageous embodiment.
Figure 3B:
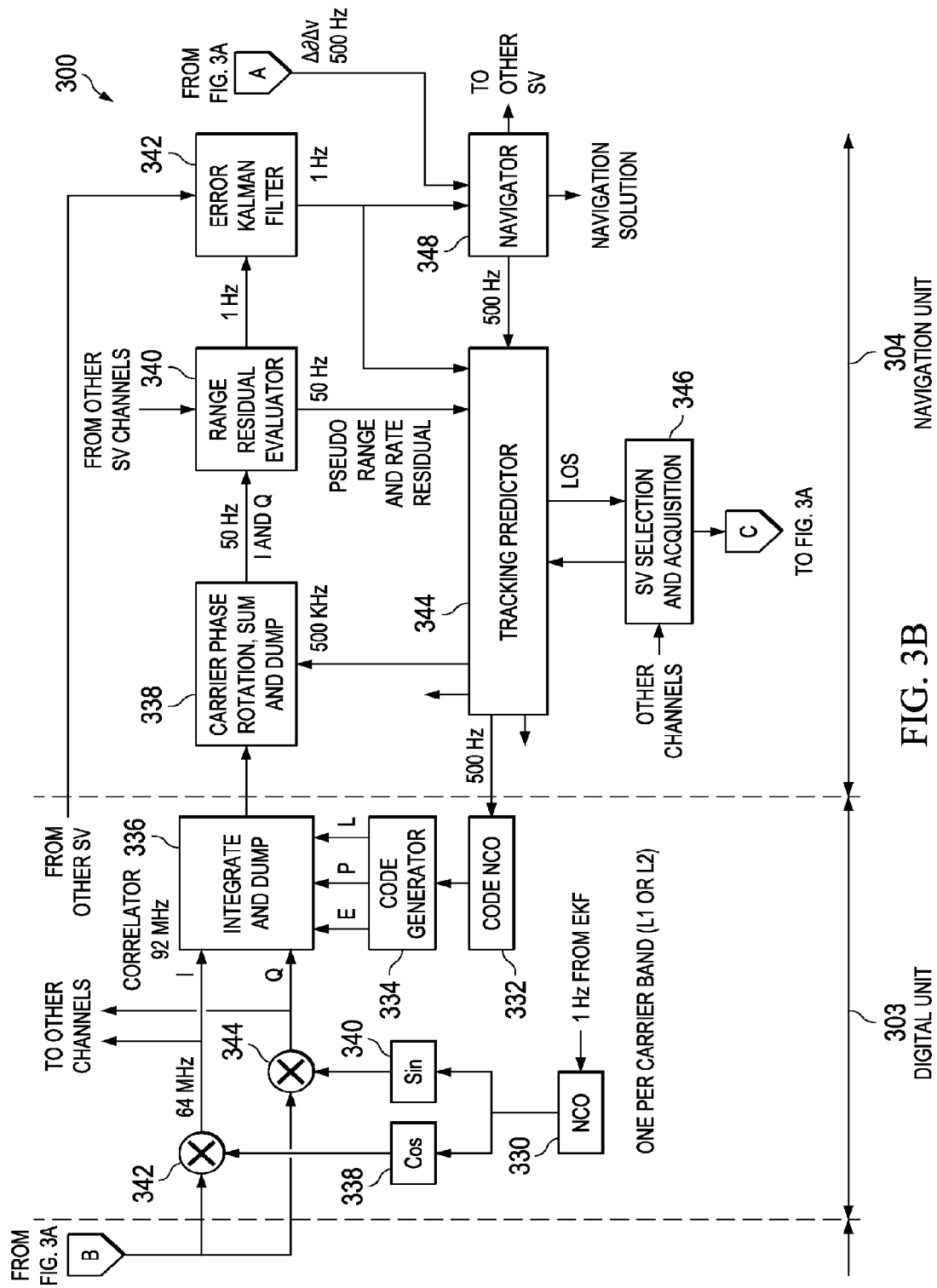

With reference now to FIGS. 3A and 3B, a schematic diagram of a navigation system is depicted in accordance with an advantageous embodiment. Navigation system 300 is one example of implementation of navigation system 200 in FIG. 2. In particular, this implementation is an example of an ultra tightly coupled global positioning system inertial navigation system. In this example, navigation system 300 comprises measurement unit 302 and navigation unit 304. Measurement unit 302 contains an inertial measurement unit and a global positioning system receiver.

In this example, inertial measurement unit (IMU) 305 is an example of inertial measurement unit 204 in FIG. 2. In this example, a global positioning system comprises antenna 306, antenna 308, antenna 310, antenna 312, front end processing chain 314, front end processing chain 316, and antenna to channel switch 318. These components are a part of the radio frequency portion of the global positioning system receiver. Additionally, digital unit 303 is part of the global positioning system receiver.

Front end processing chain 314 includes Combiner 320, low noise amplifier (LNA) 322, down converter (DC) 324, and analog to digital converter (ADC) 326. Front end processing chain 316 includes combiner (C) 321, low noise amplifier (LNA) 323, down converter (DC) 325, and analog to digital converter (ADC) 327. These front end processing chains are used to condition the radio frequency (RF) signal for later use. Antenna to channel switch 318 selects one or more of the inputs for use.

Digital unit 303 comprises numerically controlled oscillator (NCO) 330, numerically controlled oscillator 332, pseudo-random-noise (PN) code generator 334, integrate and dump units 336, cosine unit 339, sine unit 341, summing unit 343, and summing unit 334.

Digital unit 303 is an example of one implementation of components in a global positioning system receiver. Digital unit 303 may have an acquisition mode and a signal tracking mode. A signal tracking mode is identical to that found in typical global positioning system receivers. A signal acquisition mode may use position, velocity, and altitude from an inertial navigator.

Navigation unit 304 comprises carrier phase rotation sum and dump 338, range residual evaluator 340, error Kalman filter 342, tracking predictor 344, selection and acquisition 346, and navigator 348. In these examples, navigator 348 is the component in which different navigation solutions may be generated. Different advantageous embodiments may generate navigation solutions in this particular component within navigation unit 304.

Navigation system 300 is one example of hardware and/or software in which different advantageous embodiments may be implemented. Of course, other advantageous embodiments may be implemented in other types of navigation systems. The illustration of this particular example is not meant to imply architectural limitations to the hardware and/or software in which different advantageous embodiments may be implemented.

Figure 4:
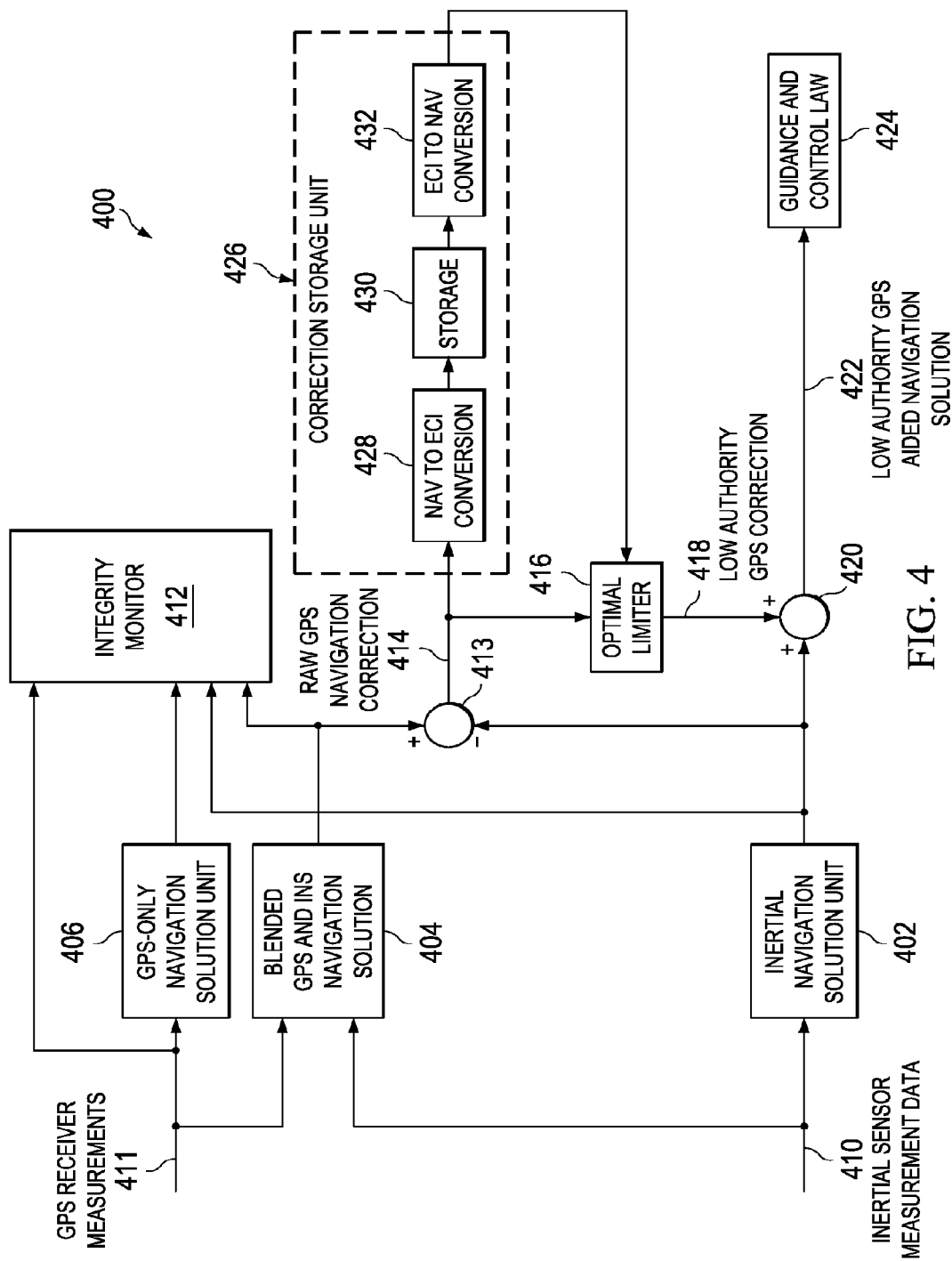
FIG. 4 is a block diagram of components in a navigation system in accordance with an advantageous embodiment.

Turning now to FIG. 4, a block diagram of components in a navigation system is depicted in accordance with an advantageous embodiment. In this example, navigation system 400 is an example of components that may be executed in a navigation unit, such as navigation unit 200 in FIG. 2. Navigation system 400 may provide navigation solutions used to control the flight or movement of a vehicle. These components may include software components, hardware components, and/or a combination of the two.

In this example, navigation unit 400 includes components to generate navigations solutions, such as inertial navigation solution unit 402, blended global positioning system and inertial navigation system navigation solution unit 404, and global positioning system only navigation solution unit 406. In these examples, each of these navigation solution units are software components that may be executed in a processor. A navigation solution generated by these units may include, for example, position, velocity, and altitude. Of course, in other embodiments, these navigation solutions may be implemented using a combination of software and hardware components.

These three navigation solution units provide separate navigation solutions. Blended global positioning system and inertial navigation system navigation solution unit 404, and inertial navigation solution unit 402 receive inertial navigation measurement data 410 from an inertial measurement unit, such as inertial measurement unit 204 in FIG. 2.

Global positioning system only navigation solution unit 406 and blended global positioning system and inertial navigation solution unit 402 receive global positioning system receiver measurements 411 from a global positioning system receiver, such as global positioning system receiver 202 in FIG. 2. Inertial navigation solution unit 402 generates a navigation solution that is incorruptible by any global positioning system threats and anomalies.

Inertial navigation solution unit 402 uses only internal measurement unit measurements and a gravity model in these examples to generate a navigation solution. Inertial navigation solution generated by inertial navigation solution unit 402 is typically used for real time guidance and control and may be used as a fallback when a global positioning signal is totally unusable.

Inertial navigation solution unit 402 generates an all inertial navigation solution that is incorruptible by any type of global positioning system anomalies. This type of solution may be used as a reference for computing global positioning system based navigation corrections. This type of solution also may be used as a reference for detecting global positioning system threats and anomalies.

Blended global positioning system and inertial navigation solution unit 404 generates a blended navigation solution that uses inertial measurement unit measurements and a gravity model with periodic updates using global positioning system measurements. This type of solution is an optimal blending of inertial measurement unit measurements and global positioning system measurements. The blending is often performed using an extended Kalman filter.

Blended global positioning system and inertial navigation solution 404 uses global positioning system data. As a result, the navigation solution generated by this type of unit may be corrupted by global positioning system anomalies. Implementation of this type of solution may use either tight coupling or ultra tight coupling. Tight coupling uses pseudo range and delta pseudo range measurements. Ultra tight coupling uses phase and quadrature measurements.

Global positioning system only navigation solution unit 406 generates an all global positioning system navigation solution computed using only global positioning system data. This type of solution may be corrupted by a global positioning system. In these examples, global positioning system navigation only solution unit 406 generates a solution that may be used for global positioning system integrity monitoring. This solution may be compared with an inertial navigation solution and the solutions generated by blended global positioning system and inertial navigation system navigation solution unit 404 in FIG. 4, which is elaborated in FIGS. 3A and 3B. Other components in FIG. 4 are not discussed in FIGS. 3A and 3B.

The output of inertial navigation solution unit 402, blended global positioning system and inertial navigation system navigation solution unit 404, and global position system only navigation solution unit 406 are sent into integrity monitor 412. Integrity monitor 412 also receives global positioning system provided health data in global positioning system receiver measurement 411.

In addition, integrity monitor 412 uses the different solutions and the data to determine whether corruption or anomalies have occurred within global positioning system receiver measurements 411. Global positioning system spoofing and meaconing can be detected by the integrity monitor 412.

The output of blended global positioning system and inertial navigation system navigation solution unit 404 and inertial navigation solution unit 402 are sent into difference node 413. Difference node 413 subtracts the output of inertial navigation solution unit 402 from the output of blended global positioning system and inertial navigation system navigation solution unit 404 to generate raw global positioning system navigation correction 414. Difference node 413 is an example of a correction unit, which is a software and/or hardware component that is capable of generating a correction for a navigation solution.

This raw correction is sent to optimal limiter 416, which may limit raw global positioning system navigation correction 414. Optimal limiter 416 may limit the amount of correction within some range for a set of values. A set of items as used herein refers to one or more items. For example a set of values is one or more values.

If raw global positioning system navigation correction 414 is greater than the range, optimal limiter 416 limits the correction to a value within the range. In other words, if raw global positioning system navigation correction 414 has a value that is greater than the upper limit of the range, optimal limiter 416 may only generate an output that has the value of the upper limit of the range.

The output of optimal limiter 416 is low authority global positioning system correction 418. This correction is sent into summing node 420. Additionally, the output of inertial navigation solution unit 402 also is sent into summing node 420, which is an example of an adding unit. An adding unit is any software and/or hardware component that adds a correction to a navigation solution. Summing node 420 generates low authority global positioning system aided navigation solution 422, which is sent to guidance and control law 424 in these examples.

This correction is modified or limited in a manner to reduce the effect of corruption to a global positioning system signal.

The different advantageous embodiments recognize that protection against undetected global positioning system anomalies may be provided. In the different advantageous embodiments, this protection may optimally limit the global positioning system based navigation correction to some error bound by the inertial navigation solution. This error bound is a range of corrections that may be used. This range may vary over time.

The range used to limit the amount of navigation correction that may be allowed may be selected based on predicted inertial navigation errors or based on historical flight test navigation errors. Predicted inertial navigation errors can be predicted by error covariance analysis of the inertial navigation system. This type of limit is small enough to ensure range safety while being large enough to enable sufficient global positioning system based navigation corrections under normal global positioning system operations. The selection of the range varies and may be based on factors, such as range safety and a desired level of accuracy.

In the different advantageous embodiments, integrity monitor 412 performs integrity monitoring. Integrity monitor 412 uses both global positioning system provided health data and derived global positioning system health data. Global positioning system provided health data is data received from a global positioning system receiver. This may include, for example, satellite status, receiver status, receiver channel Status, receiver track Status, carrier to noise ratio, jamming to signal ratio, dilution of precision, figure of merit, and other suitable data. Derived global positioning system health data is data that is generated using global positioning data. This data may include, for example, a Kalman filter residual check, a Kalman filter residual trending, Kalman filter correction sanity check, global positioning system and inertial measurement unit parameters sanity check, error covariance check, navigation solutions cross comparison, and other suitable data.

A technique of digital isolation of navigation solutions in the processor is employed to enhance integrity. In these examples, the digital isolation avoids inadvertent cross corruption of the four different solutions by storing these solutions in separate non-overlapping memory partitions. Further, digital isolation also includes computing these solutions in separate execution time slots such that the halt or complication of one of these solutions due to a computer system halt does not halt the computation of the rest of the navigation solutions. This isolation is also known as ARINC 653 partitioning. This type of partitioning is promulgated through Aeronautical Radio, Inc. (ARINC).

ARINC 653 is a specification for system partitioning and scheduling that may be used in safety and mission critical systems. This type of specification may be used in avionics equipment or other guidance equipment. Isolation is used to avoid corruption. Integrity monitor 412 is a prior art so it is not discussed in detail here. Integrity monitoring compares the navigation solution from GPS only, inertial only, and blended GPS/INS to determine if the GPS is healthy and trustworthy.

Additionally, the different advantageous embodiments provide an ability to undo corrections that were previously made to the navigation solutions. This ability is made by saving the corrections in a storage unit in a manner such that these saved corrections may be used to undo corrections made to the navigation solutions at a later time. In the different advantageous embodiments, these corrections are saved with time tags that allow those corrections to be undone at a later time.

Correction storage unit 426 includes navigation frame to earth centered inertial (ECI) frame conversion 428, storage 430, and earth centered inertial frame to navigation frame conversion 432. In these examples, correction storage unit 426 includes a feature that allows for storage of navigation corrections. The storage of these navigation corrections are made in a manner that allows for undoing or removing previous corrections.

In other words, the stored corrections are stored in the manner that allows for the navigation system to undo prior corrections. These prior corrections may be undone if a determination is made that an anomaly or unacceptable error in the navigation solution has occurred. In operation, correction storage unit 426 is capable of storing raw corrections in association with a set of time stamps in a manner that allows a selected raw correction to be retrieved from a prior time for use by the adding unit in place of a current raw correction that is used by optimal limiter 416.

This unacceptable error may occur because of global positioning system anomalies, spoofing, meaconing, or other causes. In these examples, an earth centered initial reference frame is used to store these corrections to allow for the corrections to be undone.

Navigation frame to earth centered inertial frame conversion 428 performs a conversion of the raw global positioning system navigation correction into an earth centered inertial reference frame. This type of reference frame does not change over time. This type of reference frame is time-invariant in inertial space. These corrections are stored in storage 430 along with a time stamp or other information to identify the time at which these corrections were generated. If this information is needed, this information is sent to earth centered inertial frame to navigation frame conversion 432 to convert the information back into a global positioning system base navigation correction format.

In these advantageous embodiments, the different components within correction storage unit 426 provide an ability to undo or remove unwanted corrections. In many cases, a global positioning system threat or anomaly may be detected after the optimally limited global positioning system based navigation corrections have been applied for some period of time. The different advantageous embodiments provide a mechanism for undoing prior corrections by converting all corrections from the navigation reference frame to an earth centered inertial reference frame. The earth centered inertial reference frame does not change over time. As a result, the corrections stored may be applied at a later time as long as the appropriate propagation and conversion to the navigation reference frame is performed.

For example, when a certain amount of correction is desired to be undone due to spoofing, the uncorrupted correction at a time before the spoofing in the earth centered inertial reference frame is retrieved. The correction is up to the point in time before which the corrections are desired to be undone. The correction is propagated in the earth centered inertial frame to the current time at which correction is being applied. The corrections are then converted to the navigation reference frame and applied.

This type of process may be used because global positioning system anomalies are typically detected after they have occurred.

The process then goes back in time to undo unwanted corrections to ensure safety. In one example, if the total corrections in position and velocity at a past time t1 are delta_p1 and delta_v1, assume the total corrections at current time t2 are delta_p2 and delta_v2. Assume that at time t2, the integrity monitor determines that the GPS has been spoofed after time t1. At this point, it is desired to remove all corrections after time t1.

Essentially, the velocity corrections to be removed are (delta_v2−delta_v1) in ECI and then are converted to the navigation frame at current time t2. The position correction to be removed is (delta_p2−delta_p1)−delta_v1*(t2−t1) in ECI frame and then are converted to the navigation frame at current time t2.

In the illustrative examples, the removal of the correction may be performed by retrieving raw global positioning system navigation corrections at the past time t1, which are delta_v1 and delta_p1 in the earth centered inertial frame, propagating them to current time t2, which becomes delta_v1 and delta_p1+delta_v1*(t2−t1), converting them from the earth centered inertial frame to the navigation frame at time t2, then applying the converted corrections thru the optimal limiter 416 at time t2. In general, navigation frames at time t1 and at time t2 are different, and optimal limits of optimal limiter at time t1 and at time t2 are also different and are all time varying.

In these examples, each raw global positioning system correction has an associated time stamp. The correction is converted to the earth centered inertial frame for storage.

Figure 5:
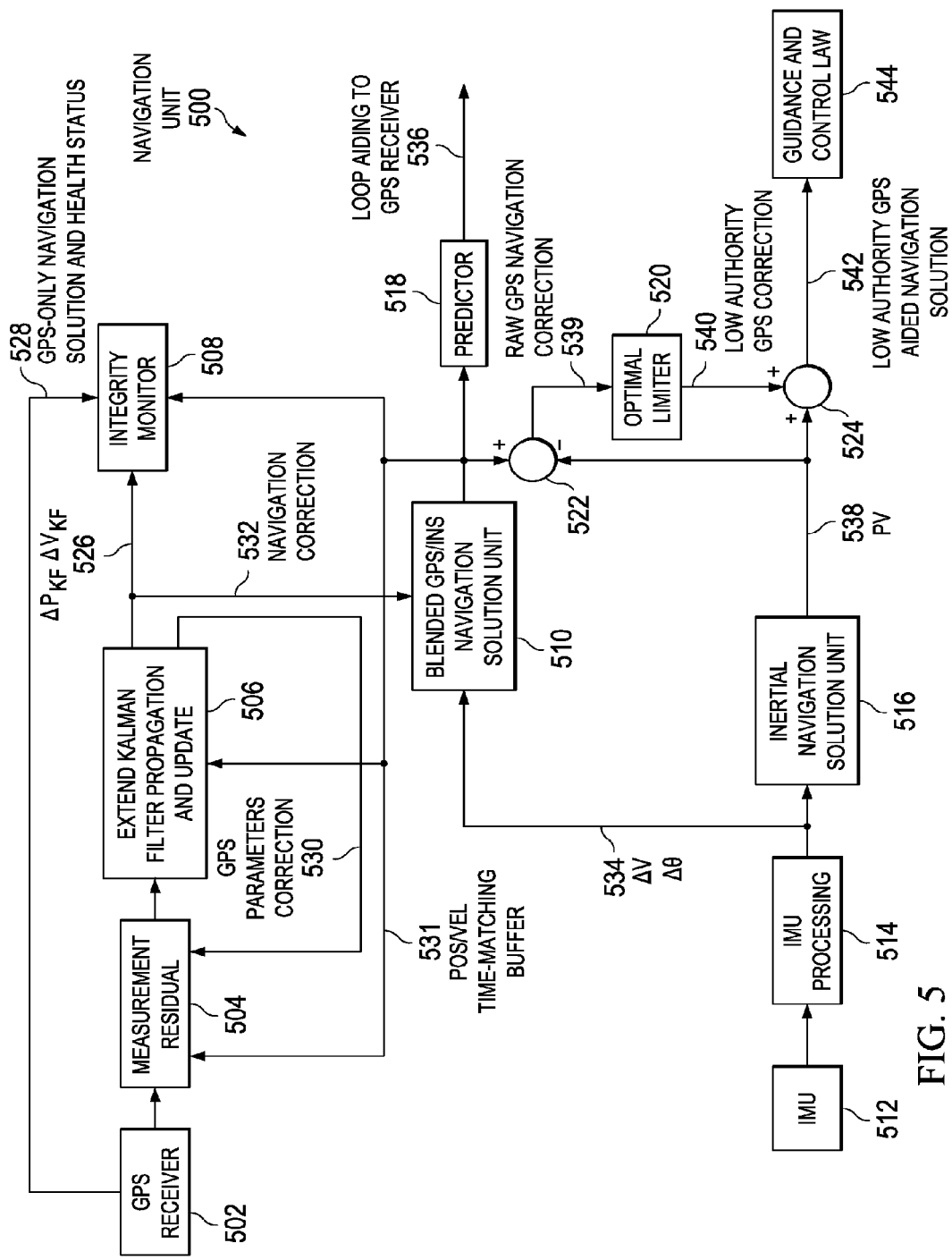
FIG. 5 is a block diagram of a navigation system in accordance with an advantageous embodiment.

Turning now to FIG. 5, a block diagram of a navigation system is depicted in accordance with an advantageous embodiment. In this example, navigation unit 500 is a more detailed version of navigation unit 400 in FIG. 4 in which data flow is shown.

In this example, navigation unit 500 includes global positioning system receiver 502, measurement residual 504, extend Kalman filter propagation and update 506, integrity monitor 508, blended global positioning system and inertial navigation system navigation solution unit 510, inertial measurement unit 512, inertial measurement unit processing 514, inertial navigation solution unit 516, predictor 518, optimal limiter 520, difference node 522, and summing node 524. Blended global positioning system and inertial navigation solution unit 510 is similar to blended global positioning system and inertial navigation system navigation solution 404 in FIG. 4. Inertial navigation solution unit 516 is similar to inertial navigation solution unit 402 in FIG. 4.

Global positioning system receiver 502 receives global positioning signals to generate global positioning system receiver measurements, which are sent to measurement residual 504. Measurement residual 504 generates residuals. These residuals are the difference between the GPS measured range/rate and the blended global positioning system and inertial navigation system estimated range/rate. The residuals are used by extend Kalman filter propagation and update 504, to compute corrections for the GPS parameters, inertial measurement unit parameters, and blended navigation solution. In these examples, the inertial measurement unit parameters are used in blended global positioning system and inertial navigation system navigation solution unit 510.

Extend Kalman filter propagation and update 506 generates $\Delta P_{KF}$ and $\Delta V_{KF}$ 526, which is sent to integrity monitor 508 to assist in monitoring global positioning system health and integrity. This output contains corrections in position and velocity.

Global positioning system receiver 502 also generates global positioning system only navigation solution and health status 528, which is sent to integrity monitor 508 for use, at least in part, in determining whether spoofing, meaconing, corruption, or some other undesirable anomaly has occurred in the data generated by global positioning system receiver 502.

Extend Kalman filter propagation and update 504 also generates global positioning system parameters correction 530. These corrections are used to update the global positioning system parameters, such as receiver clock bias, clock drift, and pseudorange bias used in measurement residual 504.

In the process of computing the residuals, time matching of global positioning system data and navigation solution is performed. Generally, the global positioning system receiver and inertial measurement unit are asynchronous in time. In other words, these different units generate data which may be output and available at different times. One time matching technique interpolates the navigation solution to the global positioning system data sampling time. The blended navigation solutions have to be stored in a time-matching buffer for use in interpolation. The time-matching buffer is a buffer that stores vehicle position, velocity, and associated time stamp for use in the interpolation.

Extend Kalman filter propagation and update 506 also generates data in the form of corrections in position and velocity. This output is sent to integrity monitor 508. Integrity monitor 508 also receives output from blended global positioning system and inertial navigation system navigation solution unit 510 and inertial navigation solution unit 516. Integrity monitor 508 performs integrity monitoring in a fashion similar to integrity monitor 412 in FIG. 4.

In this example, blended global positioning system and inertial navigation system navigation solution 510 receives navigation correction 532 from extend Kalman filter 506 for updating the blended navigation solution. This navigation correction is the same as $\Delta P_{KF}$ and $\Delta V_{KF}$ 526. This component also receives $\Delta V$ and $\Delta\Theta$ 534, which is the change in velocity and the change in angle generated by inertial measurement unit processing 514. These inputs are used to generate the blended navigation solution, which is sent to predictor 518, difference node 522, measurement residual 504, and integrity monitor 508 in these examples.

Predictor 518 propagates the blended navigation solution forward in time to generate signals to assist global positioning system code and carrier tracking loops. These loop aiding signals include Doppler frequency shifts due to vehicle velocity and vehicle altitude change for the antenna selection. Inertial navigation solution unit 516 outputs PV 538, which contains position and velocity information.

In these examples, the output from blended global positioning system and inertial navigation system navigation solution unit 510 and inertial navigation solution unit 516 are sent to difference node 522. Difference node 522 subtracts PV 538 from the output of blended global positioning system and inertial navigation system navigation solution unit 510 to generate raw global positioning system navigation correction 539. This correction is sent to optimal limiter 520, which may limit the amount of correction to some range or threshold level.

The optimal limiter 520 is the same as optimal limiter 416 in FIG. 4. The output from optimal limiter 520 is the low authority global positioning system correction 540. This correction is summed with PV 538 from inertial navigation solution unit 516 to form low authority global positioning system aided navigation solution 542. This information is sent to guidance and control law 544 for controlling of the vehicle in these examples.

Guidance and control law 544 includes computing the desired velocity and position. The difference between the desired velocity/position and the estimated velocity/position from navigation is the velocity and position errors that need to be nulled. The guidance and control law 544 also computes required actuator commands to null the velocity/position errors.

Figure 6:
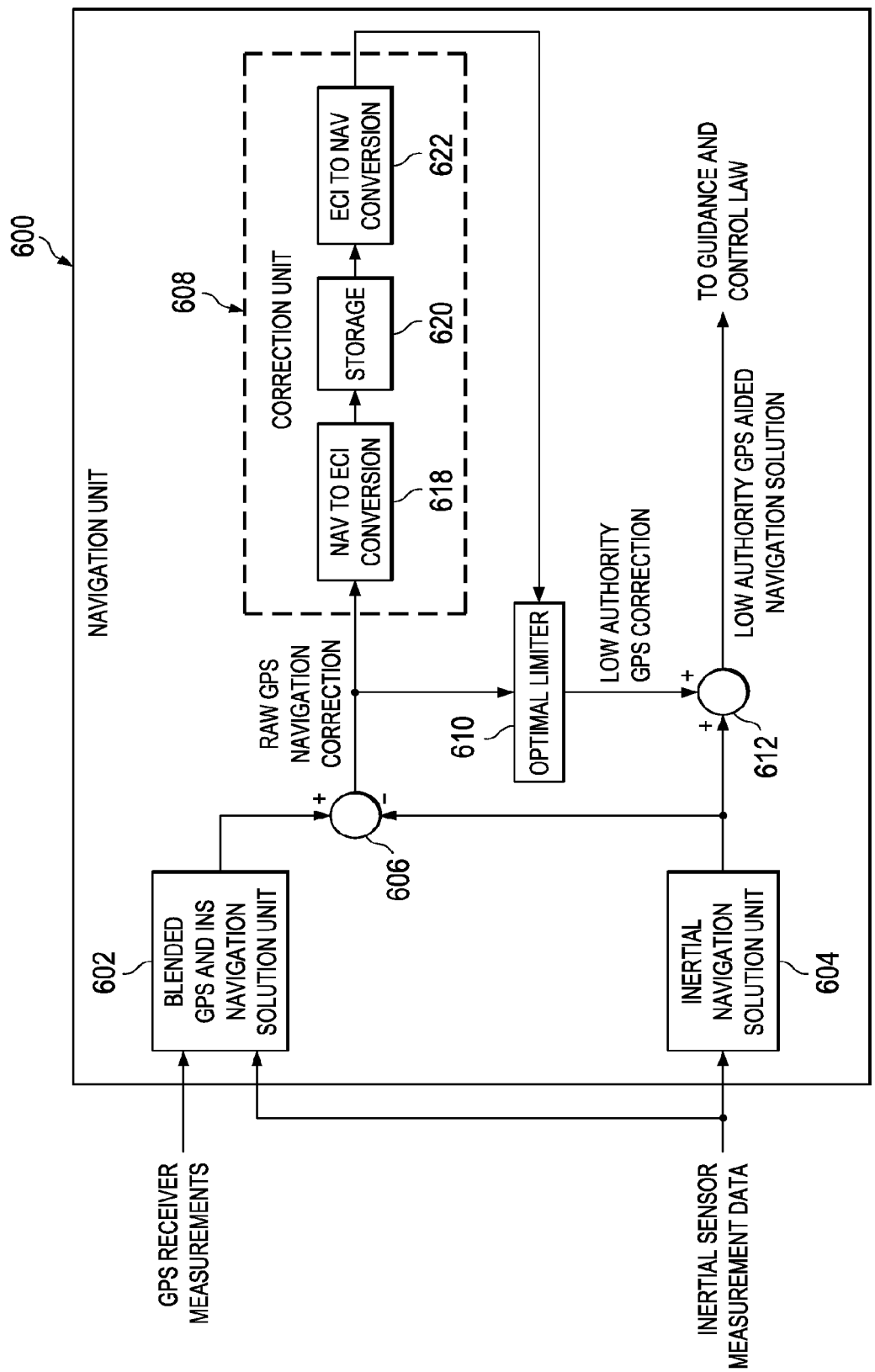
FIG. 6 is a block diagram of components in a navigation system in accordance with an advantageous embodiment.

With reference now to FIG. 6, a block diagram of components in a navigation unit is depicted in accordance with an advantageous embodiment. In this example, navigation unit 600 consists of basic components that may be implemented in a navigation unit, such as navigation unit 200 in FIG. 2 for a low authority global positioning system aiding navigation system. FIG. 6 shows only some components from FIG. 4. In this example, the components may comprise software and/or hardware components.

In this particular embodiment, navigation unit 600 includes two navigation solution units. These navigation solution units are blended global positioning system and inertial navigation system navigation solution unit 602 and inertial navigation system navigation solution unit 604. Difference unit 606 takes a difference between the solution generated from blended global positioning and inertial navigation solution unit 602 and inertial solution unit 604. The output of difference unit 606 is sent into correction unit 608 and optimal limiter 610. Optimal limiter 610 generates a low authority global positioning system correction. This output is summed with the output of inertial navigation solution unit 604 by summing unit 612 to generate a low authority global positioning system aided navigation solution. This solution is sent to a guidance and control system.

Correction unit 608 includes navigation to earth centered inertial frame conversion 618, storage 620, and earth centered inertial to navigation frame conversion 622. Navigation to earth centered inertial frame conversion 618 generates a form of the navigation correction that does not change over time. This form of correction is stored in storage 620. If corrections need to be undone, these corrections may be retrieved and converted back to a navigation correction by earth centered inertial to navigation frame conversion 622.

Figure 7:
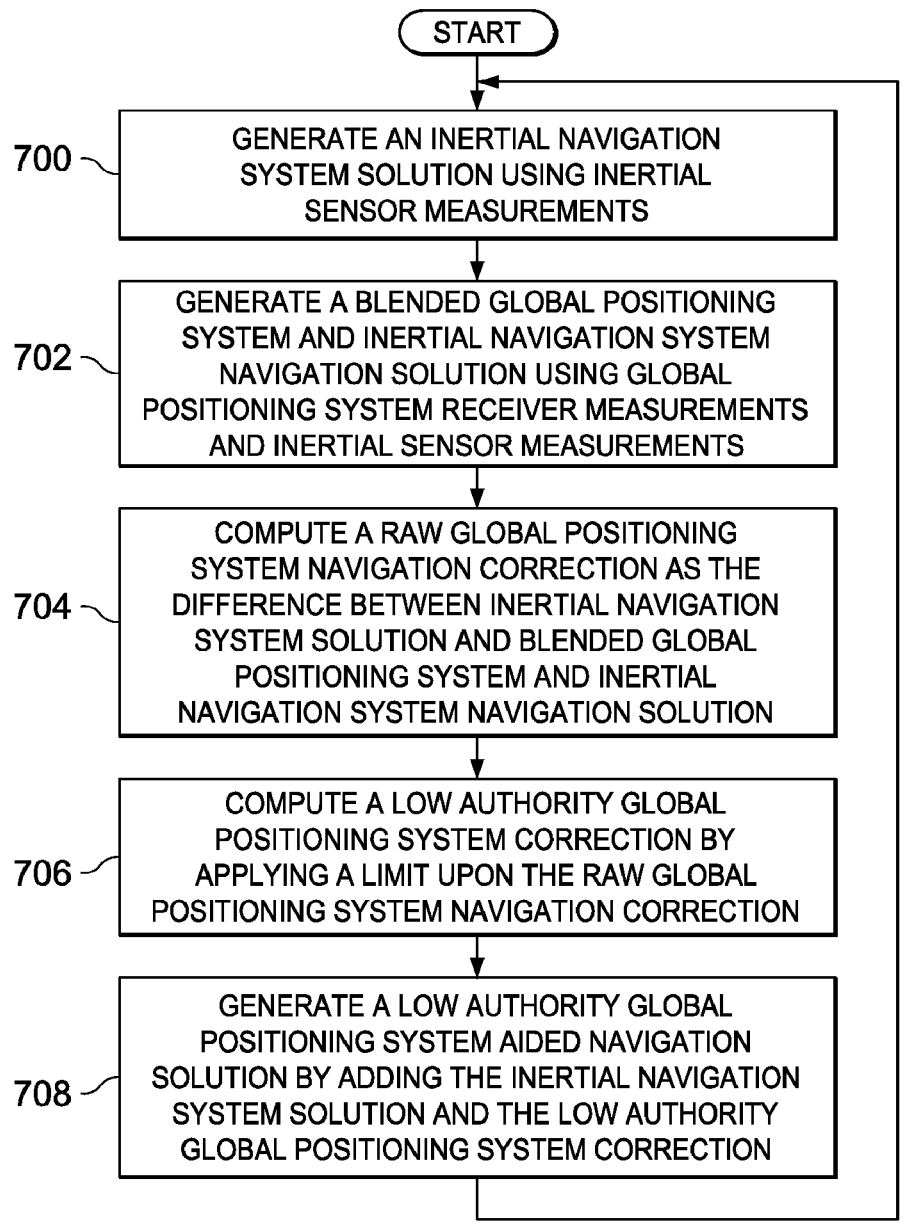
FIG. 7 is a flowchart of a process for generating a navigation solution in accordance with an advantageous embodiment.

With reference now to FIG. 7, a flowchart of a process for generating a navigation solution is depicted in accordance with an advantageous embodiment. The process illustrated in FIG. 7 may be implemented in a navigation system, such as navigation system 200 in FIG. 2. In particular, the process may be implemented by navigation unit 206.

The process begins by generating an inertial navigation solution using inertial sensor measurements (operation 700). The process then generates a blended global positioning system and inertial navigation system solution using global positioning system receiver measurements and inertial sensor measurements (operation 702). The process then computes a raw global positioning system navigation correction as the difference between the inertial navigation system solution and the blended global positioning system and inertial navigation system navigation solution (operation 704). The process then computes a low authority global positioning system correction by applying a limiter upon the raw global positioning system navigation correction (operation 706).

The process then generates a low authority global positioning system aided navigation solution by adding the inertial navigation solution and the low authority global positioning system correction (operation 708). The process then returns to operation 700 as described above. In a typical implementation, the process is repeated for each navigation output cycle. For example, if the navigation solution needs to be computed at 100 Hz, this process will be repeated every 10 milli-seconds.

This solution, in operation 708, may be used to counter global positioning system spoofing. The solution also may be used to ensure range safety under global positioning system anomalies. In launch vehicle or missile applications, when the vehicle deviates from the intended target trajectory by a certain preset amount such that there is a potential of civilian damage, the vehicle will be destroyed. This type of protection is called range safety.

For a navigation system with global positioning system aiding, if the global positioning system is spoofed, the navigation aiding is significantly incorrect. If the spoofing is not detected, the vehicle may unknowingly deviate from the target trajectory to an extent that can cause civilian damage. However, the limiter in this invention can be set to be smaller than the allowable range safety deviation, such that the maximum correction from the global positioning system is limited to a value that is smaller than the allowable deviation for range safety. This feature in the different advantageous embodiments can therefore ensure range safety even under the scenario of spoofing.

In these examples, the global positioning system-aided navigation solution has the same accuracy as the blended global positioning system and inertial navigation system global positioning system and inertial navigation system navigation solution. More than around 99 percent of the time, if the 3-sigma error bound is used and there is no global positioning system anomaly present, the 3-sigma error bound is equal to around three times of the standard deviation of the error covariance of the inertial navigation system.

Figure 8:
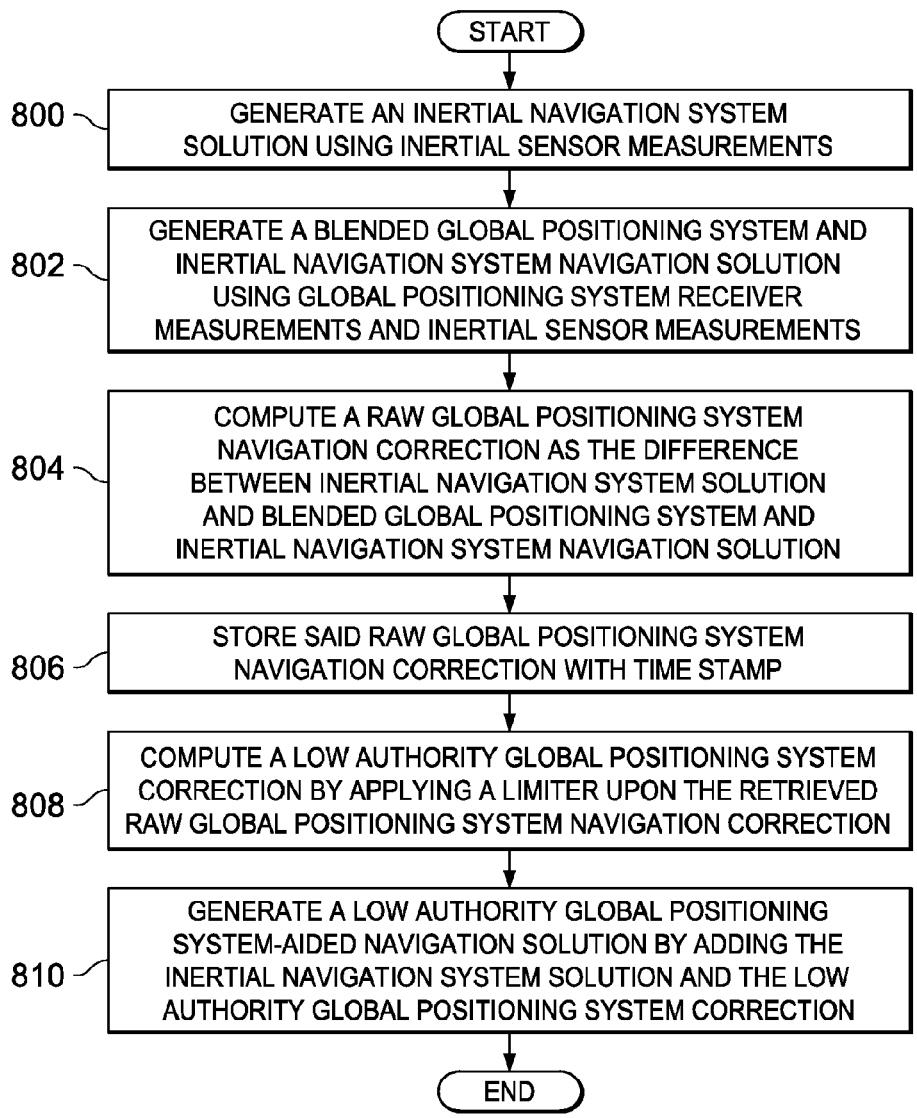
FIG. 8 is a flowchart of a process for generating navigation solutions in accordance with an advantageous embodiment.

With reference now to FIG. 8, a flowchart of a process for generating navigation solutions is depicted in accordance with an advantageous embodiment. The flowchart illustrated in FIG. 8 may be implemented in a navigation system, such as navigation system 600 in FIG. 6.

The process begins by generating an inertial navigation solution using inertial navigation sensor measurements (operation 800). The process then generates a blended global positioning system and inertial navigation system solution using global positioning system receiver measurements and inertial sensor system measurements (operation 802).

The process then computes a raw global positioning system navigation correction as a difference between the inertial navigation solution and the blended global positioning system and inertial navigation system navigation solution (operation 804). The process then stores the raw global positioning system navigation correction with a time stamp (operation 806). This operation allows for prior corrections to be retrieved at a later point in time. A low authority global positioning system correction is then computed by applying a limiter on the retrieved raw navigation correction (operation 808).

The process then generates a low authority global positioning system aided navigation solution by adding the inertial navigation solution and the low authority global positioning system correction (operation 808), with the process looping back to the beginning for each navigation output cycle.

Figure 9:
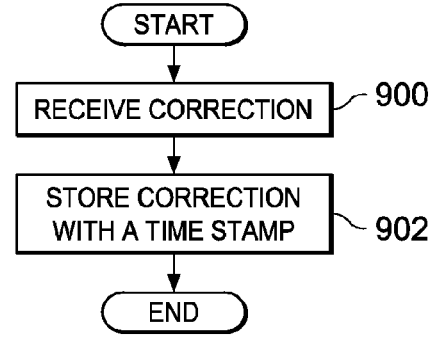
FIG. 9 is a flowchart of a process for storing corrections to navigation solutions in accordance with an advantageous embodiment.

With reference now to FIG. 9, a flowchart of a process for storing corrections to navigation solutions is depicted in accordance with an advantageous embodiment. The process illustrated in FIG. 9 may be implemented in a navigation unit, such as navigation unit 400 in FIG. 4. In particular, the process may be implemented in navigation to earth centered inertial frame conversion 422 in FIG. 4.

The process begins by receiving a correction (operation 900). The process then converts the correction to ECI frame and stores the correction with a time stamp (operation 902), with the process terminating thereafter. This process is performed for each correction that is generated.

Figure 10:
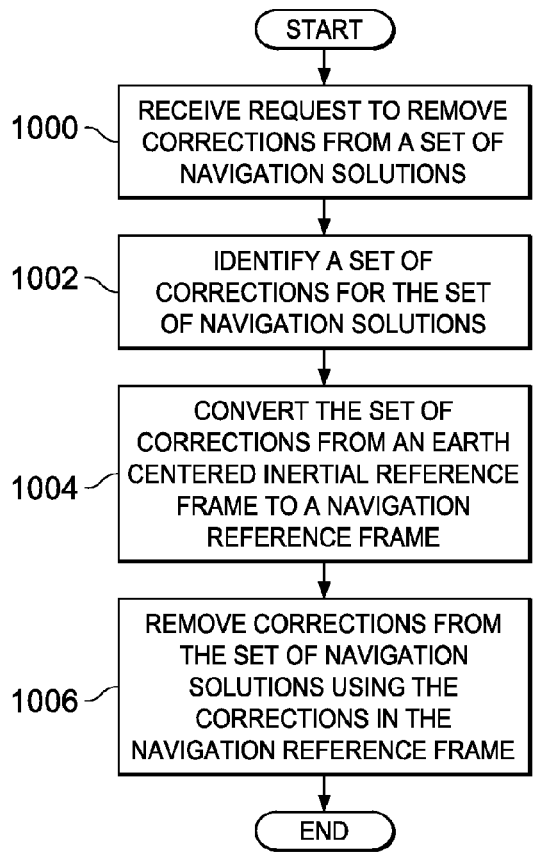
FIG. 10 is a flowchart of a process for removing corrections from a navigation solution in accordance with an advantageous embodiment.

With reference now to FIG. 10, a flowchart of a process for removing corrections from a navigation solution is depicted in accordance with an advantageous embodiment. The process illustrated in FIG. 10 may be implemented in a navigation unit, such as navigation unit 400 in FIG. 4.

The process begins by receiving a request to remove corrections from a set of navigation solutions (operation 1000). In response to receiving this request, the process identifies the set of corrections for the set of navigation solutions (operation 1002). These corrections may be stored in a storage, such as storage 424 in FIG. 4. The process then converts the set of identified corrections from an earth centered inertial reference frame to a navigation reference frame (operation 1004). The process then removes the correction from the set of navigation solutions using the corrections in the navigation reference frame (operation 1006), with the process terminating thereafter. This process is performed for each retrieving request.

Thus, the process in FIG. 10 retrieves one or more corrections at a specified past time stamp. These corrections also may be referred to as raw global positioning system navigation corrections. The retrieved raw global positioning system navigation correction from the specified past time stamp is propagated to a current time in the earth centered inertial reference frame to form a propagated raw global positioning system navigation correction. The propagation is typically performed with numerical integration from velocity to position. The propagated raw global positioning system navigation correction is converted from the earth centered inertial frame to a navigation reference frame and applies through the limiter.

In these examples, the navigation solutions are not stored. Removing an unwanted correction is done by applying the correct correction at a current time using current navigation solutions at a current time.

Figure 11:
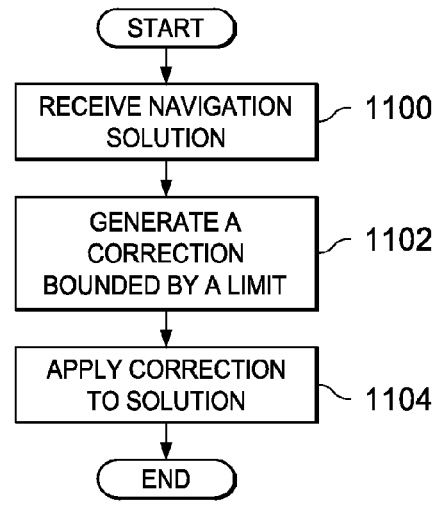
FIG. 11 is a flowchart of a process for generating an integrated solution with a limit in accordance with an advantageous embodiment.

With reference now to FIG. 11, a flowchart of a process for generating a low authority global positioning system aiding navigation solution is depicted in accordance with an advantageous embodiment. The process begins by receiving a navigation solution (operation 1100). In this example, the navigation solution is inertial navigation solution unit 402 in FIG. 4. The process then generates a correction bounded by a limit (operation 1102). This limit is based on errors bound by the inertial navigation solution or based on errors from flight test data. The process then applies the correction to the solution (operation 1104), with the process terminating thereafter. Operation 1104 generates the low authority global positioning system aiding navigation solution that reduces effects from corruption in the global positioning signal.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art.

For example, the different illustration in the figures is not meant to limit the architecture in which the different embodiments may be implemented. For example, without limitation, in FIG. 4, blended global positioning system and inertial navigation solution unit 404 generates a first navigation solution that is based on a global positioning system signal or data. The first navigation solution is not limited to this type of unit. The different advantageous embodiments may use a navigation solution from any type navigation solution unit that generates navigation solution that is based on or uses global positioning system data.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. A method for forming a navigation solution, the method comprising:
generating, by an inertial navigation solution unit, the inertial navigation solution using inertial sensor measurements;
generating, by a blended global positioning system and inertial navigation solution unit, a blended global positioning system and inertial navigation system navigation solution using a set of global positioning system receiver measurements and a set of inertial sensor measurements;
computing, by a processor, a raw global positioning system navigation correction as the difference between inertial navigation solution and blended global positioning system and inertial navigation system navigation solution;
converting the raw global positioning system navigation correction from an earth centered inertial reference frame to a navigation reference frame;
storing the raw global positioning system navigation correction with a time stamp;
retrieving a raw global positioning system navigation correction at a specified past time stamp;
removing the raw global positioning system navigation correction from a correction storage unit;
computing, by the processor, a low authority global positioning system correction by applying a limit upon the retrieved raw global positioning system navigation correction; and
adding, by the processor, the inertial navigation solution and the low authority global positioning system correction to form the navigation solution.

2. The method of claim 1, wherein the storing step comprises:
storing the raw global positioning system navigation correction with the time stamp in earth centered inertial reference frame.

3. The method of claim 1, wherein the retrieving step further comprises:
propagating the retrieved raw global positioning system navigation correction from the specified past time stamp to a current time in earth centered inertial reference frame to form a propagated raw global positioning system navigation correction; and
converting the propagated raw global positioning system navigation correction from the earth centered inertial frame to a navigation reference frame.

4. The method of claim 1, further comprising:
determining, using an integrity monitor, whether one or more of spoofing, meaconing, or corruption has occurred on data generated by the global positioning system receiver; and
in response to the determination, retrieving the raw global positioning system navigation correction at the specified past time stamp.

5. A method for forming a navigation solution, the method comprising:
generating, by an inertial navigation solution unit, an inertial navigation solution using a set of inertial sensor measurements;
generating, by a blended global positioning system and inertial navigation solution unit, a blended global positioning system and inertial navigation system navigation solution using a set of global positioning system receiver measurements and the set of inertial sensor measurements;
computing, by a processor, a raw global positioning system navigation correction as the difference between inertial navigation solution and blended global positioning system and inertial navigation system navigation solution;
converting the raw global positioning system navigation correction from an earth centered inertial reference frame to a navigation reference frame;
storing the raw global positioning system navigation correction with a time stamp;
generating a global positioning system-only navigation solution;
monitoring for global positioning system spoofing;
responsive to detecting the global positioning system spoofing, retrieving a selected raw global positioning system navigation correction at a past time before the global positioning system spoofing was detected;
removing the raw global positioning system navigation correction from a correction storage unit;
computing, by the processor, a low authority global positioning system correction by applying a limit upon the retrieved raw global positioning system navigation correction; and
adding, by the processor, the inertial navigation solution and the low authority global positioning system correction to form the navigation solution.

6. The method of claim 5, wherein the monitoring step comprises:
monitoring for global positioning system spoofing using the global positioning system only navigation solution, the inertial navigation solution, the blended global positioning system and inertial navigation system navigation solution, global positioning system receiver provided health data, and derived global positioning system health data.

7. The method of claim 5, wherein the retrieving step comprises:
retrieving a selected raw global positioning system navigation correction at a past time before the global positioning system spoofing was detected, wherein retrieving the selected raw global positioning system navigation correction at a past time before the global positioning system spoofing was detected allows the low authority global positioning system-aided navigation solution to go back in time to remove the unwanted correction during which the global positioning system is spoofed.

8. The method of claim 5, wherein the step of computing a low authority global positioning system correction by applying a limit upon the retrieved raw global positioning system navigation correction comprises:
computing a low authority global positioning system correction by applying a limit upon the retrieved raw global positioning system navigation correction associated with a past time stamp and apply the limit at a current time.

9. An apparatus comprising:
a global positioning system based navigation solution unit capable of generating a first navigation solution;
a inertial navigation solution unit capable of generating a second navigation solution;
a correction unit capable of generating a raw correction by computing a raw correction as the difference between the global positioning system based navigation solution and the inertial navigation solution;

a correction storage unit capable of converting the raw global positioning system navigation correction from an earth centered inertial reference frame to a navigation reference frame and storing raw corrections in association with a set of time stamps in a manner that allows a selected raw correction to be retrieved from a prior time for use by an adding unit in placed of a current raw correction;

removing the raw global positioning system navigation correction from the correction storage unit;

a limiter capable of selectively modifying the raw correction to fall within a selected range of corrections to form a correction; and the adding unit capable of adding the correction retrieved from the prior time to the second navigation solution to form a navigation solution.

10. The apparatus of claim 9 further comprising:

a global positioning system receiver; and an inertial navigation system unit.

\* \* \* \* \*